United States Patent
Yamaguchi et al.

(10) Patent No.: US 10,379,368 B2
(45) Date of Patent: Aug. 13, 2019

(54) ROTARY DIAL ASSEMBLY

(71) Applicants: TRAM, INC., Plymouth, MI (US); KABUSHIKI KAISHA TOKAI RIKA DENKI SEISAKUSHO, Aichi (JP)

(72) Inventors: Hiroaki Yamaguchi, Novi, MI (US); Shuri Arakawa, Ann Arbor, MI (US); Yuichi Inami, Ann Arbor, MI (US)

(73) Assignees: KABUSHIKI KAISHA TOKAI RIKA DENKI SEISAKUSHO, Aichi (JP); TRAM, INC., Plymouth, MI (US)

( * ) Notice: Subject to any disclaimer, the term of this patent is extended or adjusted under 35 U.S.C. 154(b) by 253 days.

(21) Appl. No.: 15/337,175

(22) Filed: Oct. 28, 2016

(65) Prior Publication Data

US 2018/0120578 A1     May 3, 2018

(51) Int. Cl.
    *G02B 27/28*     (2006.01)
    *G02B 5/30*     (2006.01)
    *F21V 14/08*     (2006.01)
    *F21V 9/14*     (2006.01)

(52) U.S. Cl.
    CPC ......... *G02B 27/281* (2013.01); *G02B 5/3041* (2013.01)

(58) Field of Classification Search
    CPC .. G02B 27/26; G02B 27/2278; G02B 27/281; G02B 5/3041; F21V 9/14; F21V 14/08
    See application file for complete search history.

(56) References Cited

U.S. PATENT DOCUMENTS

| | | | | |
|---|---|---|---|---|
| 4,588,259 | A | * 5/1986 | Sheiman | G02B 27/26 348/51 |
| 2003/0080923 | A1 | * 5/2003 | Suyama | G02B 27/2278 345/6 |
| 2013/0127897 | A1 | 5/2013 | Baker et al. | |

FOREIGN PATENT DOCUMENTS

| | | |
|---|---|---|
| JP | 54-121779 | 8/1979 |
| JP | 57-157987 | 10/1982 |
| JP | 2013-11795 | 1/2013 |

* cited by examiner

*Primary Examiner* — Joseph L Williams
(74) *Attorney, Agent, or Firm* — Greenblum & Bernstein, P.:.C.

(57) ABSTRACT

A rotary dial assembly includes a rotary dial configured to selectively display a plurality of graphical images and a polarized film assembly disposed in the rotary dial and configured to control the selective displaying of the plurality of graphical images on the rotary dial. When the rotary dial is rotated the polarized film assembly is illuminated such that at least one of the plurality of graphical images is displayed on the rotary dial assembly.

16 Claims, 12 Drawing Sheets

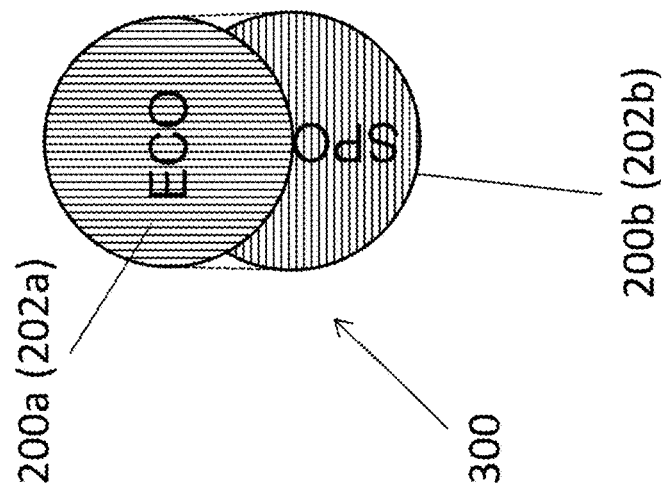
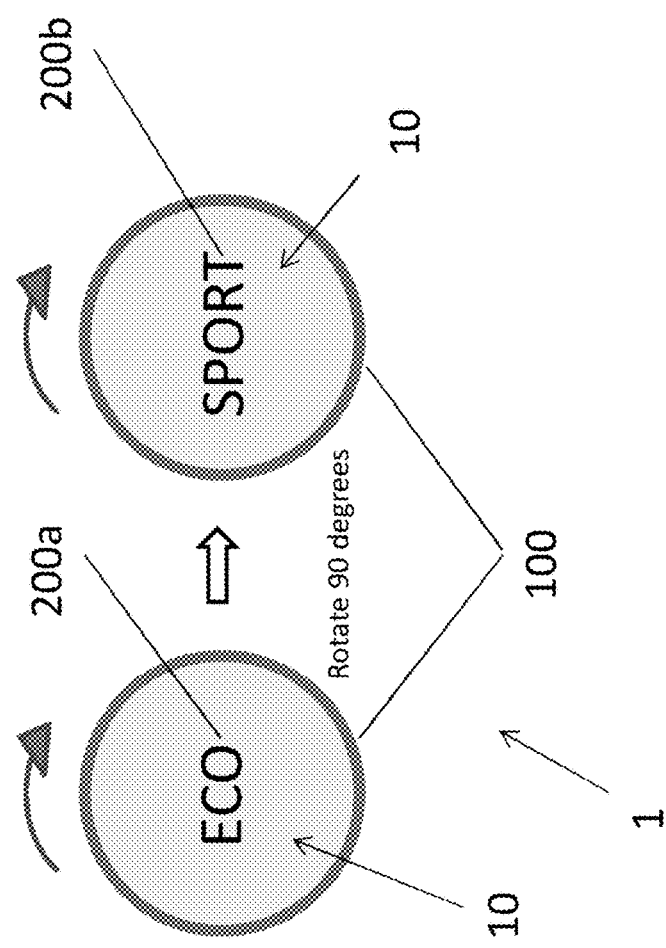

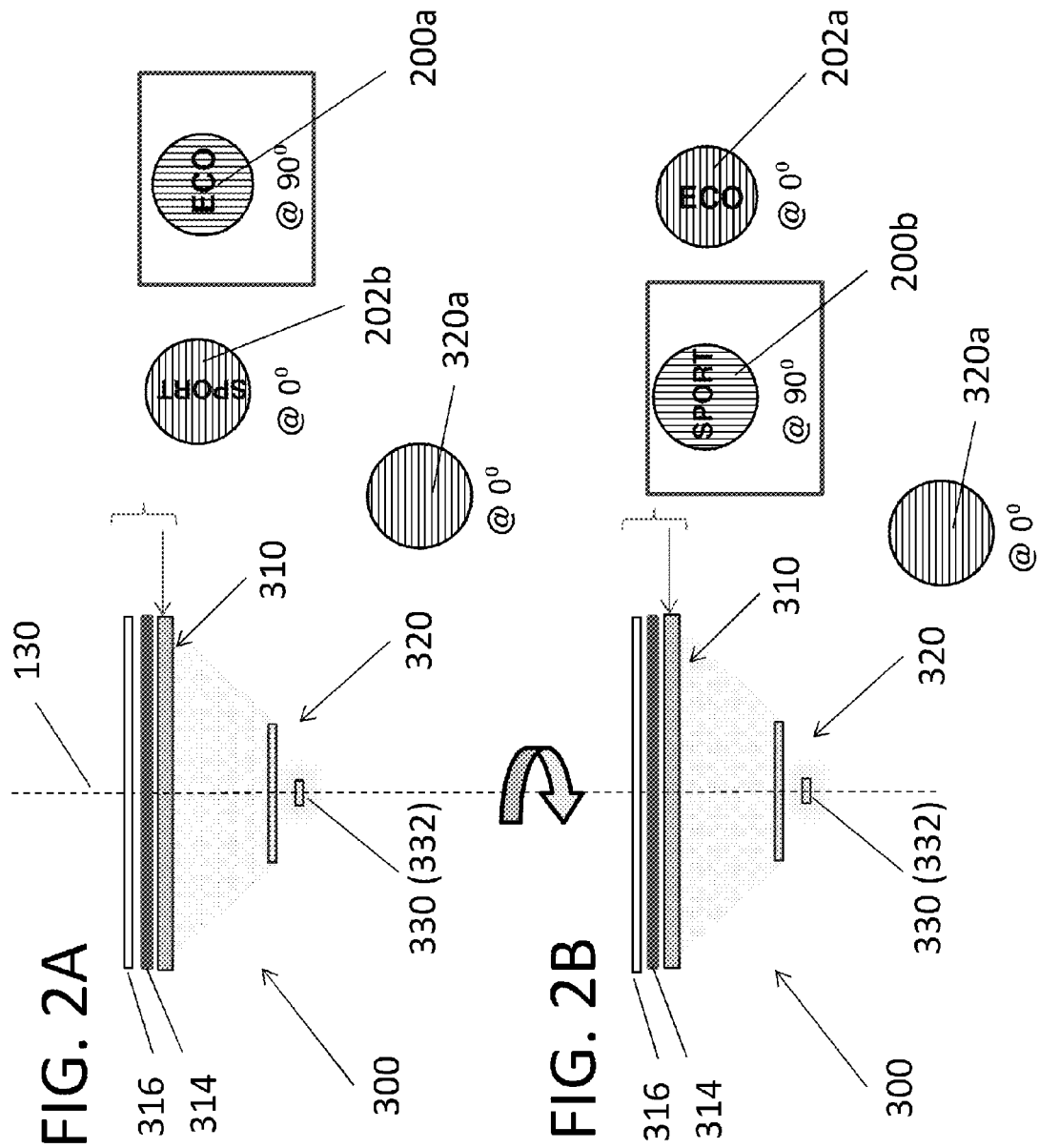

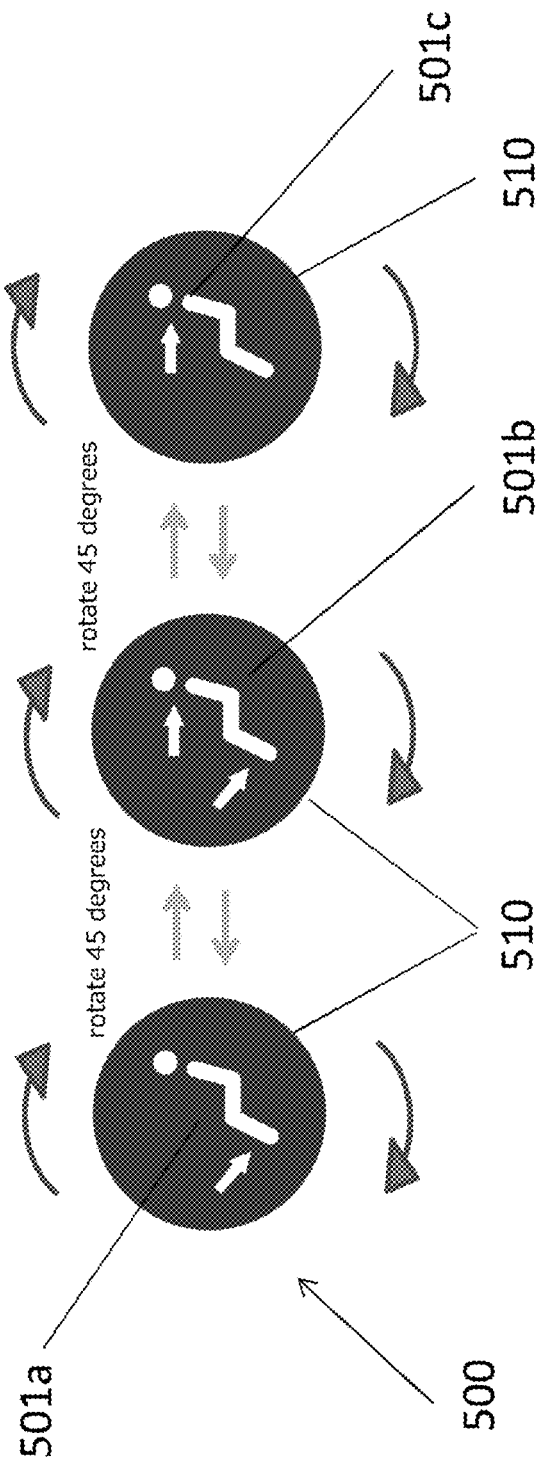

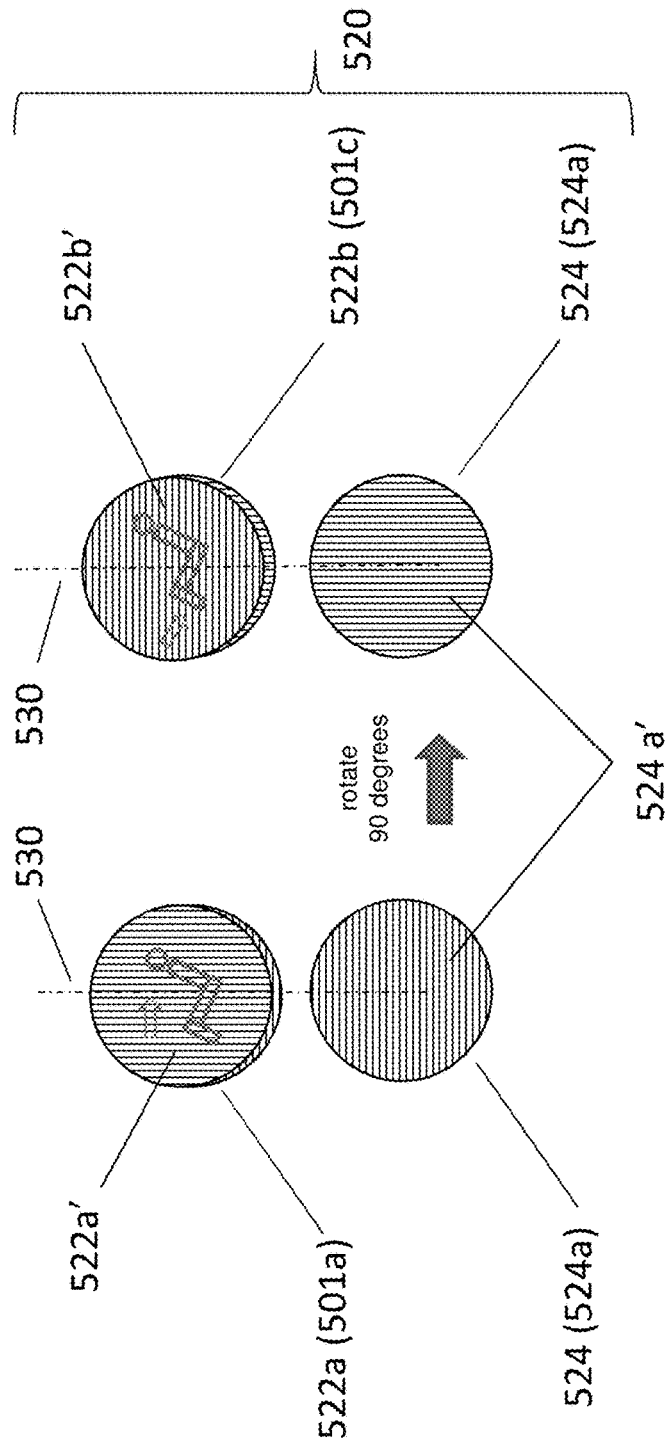

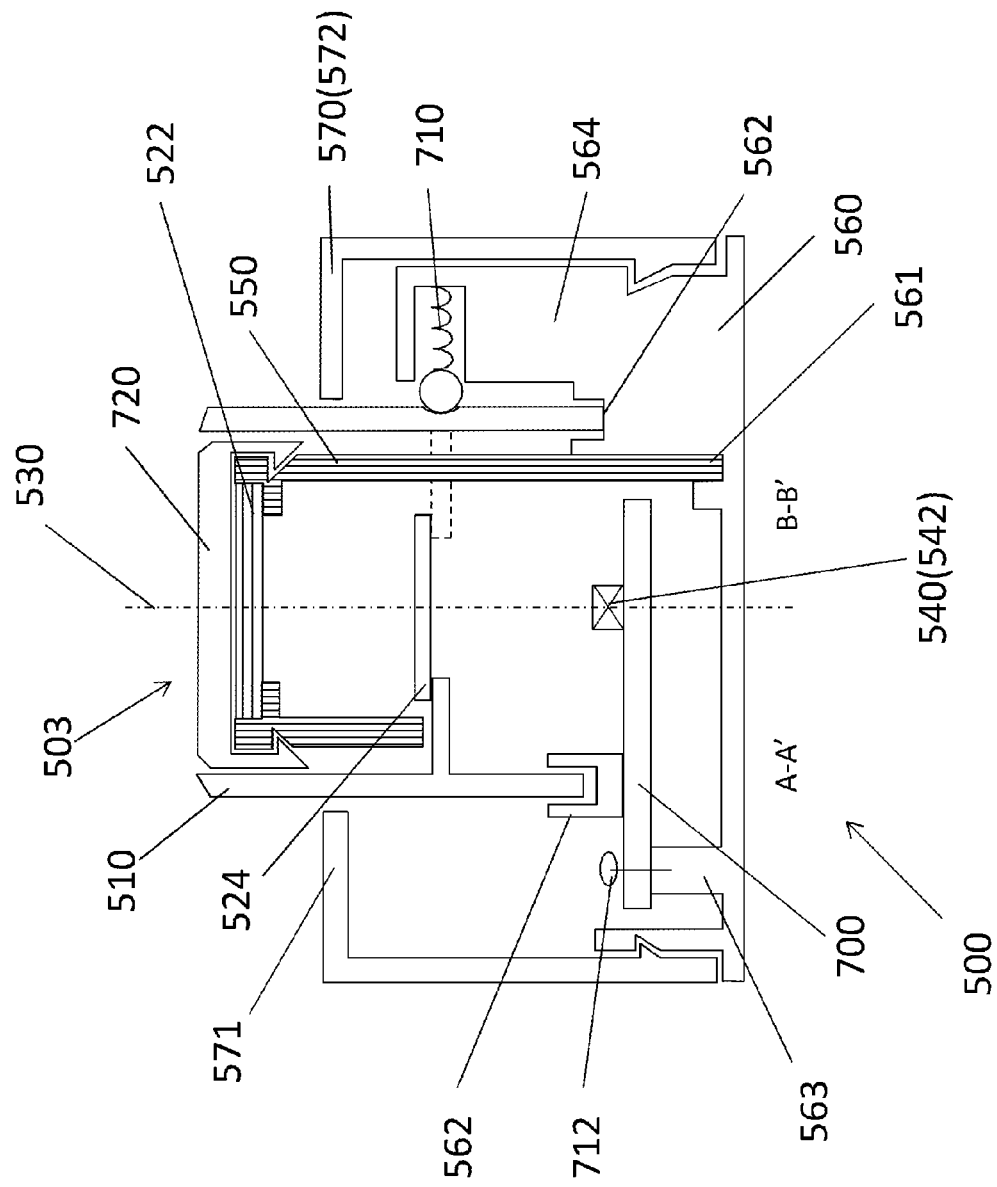

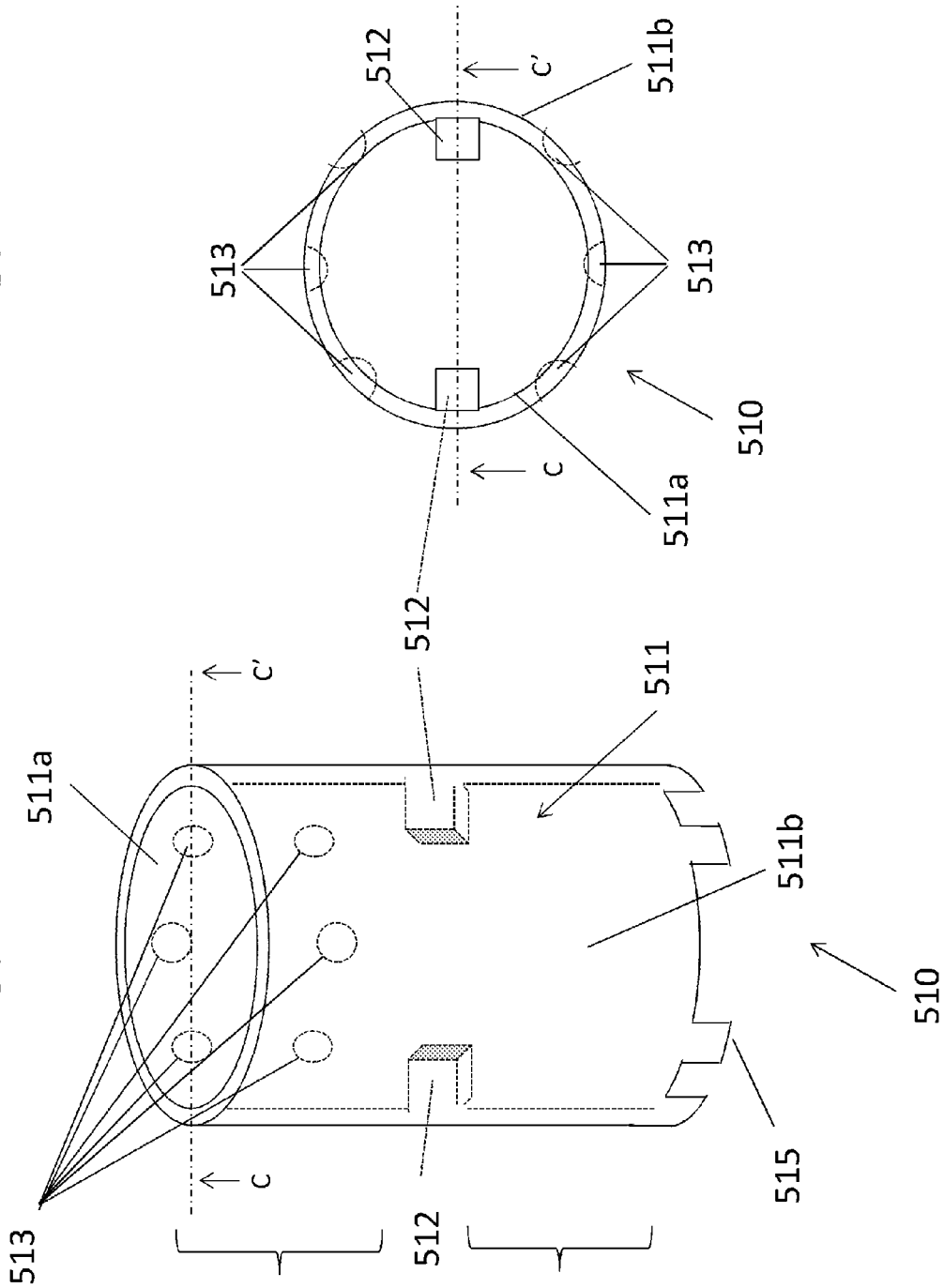

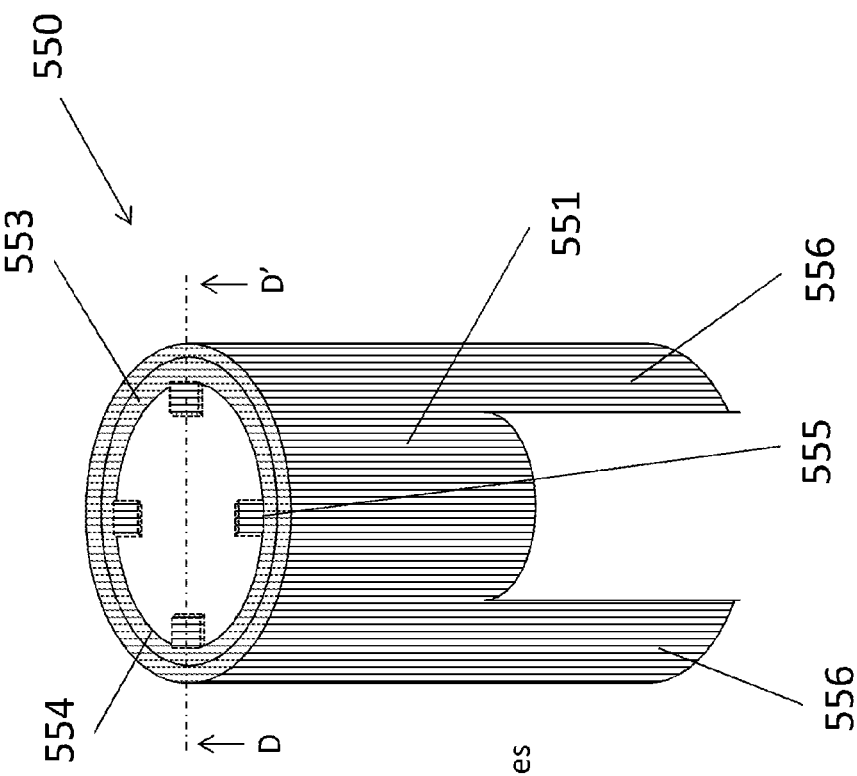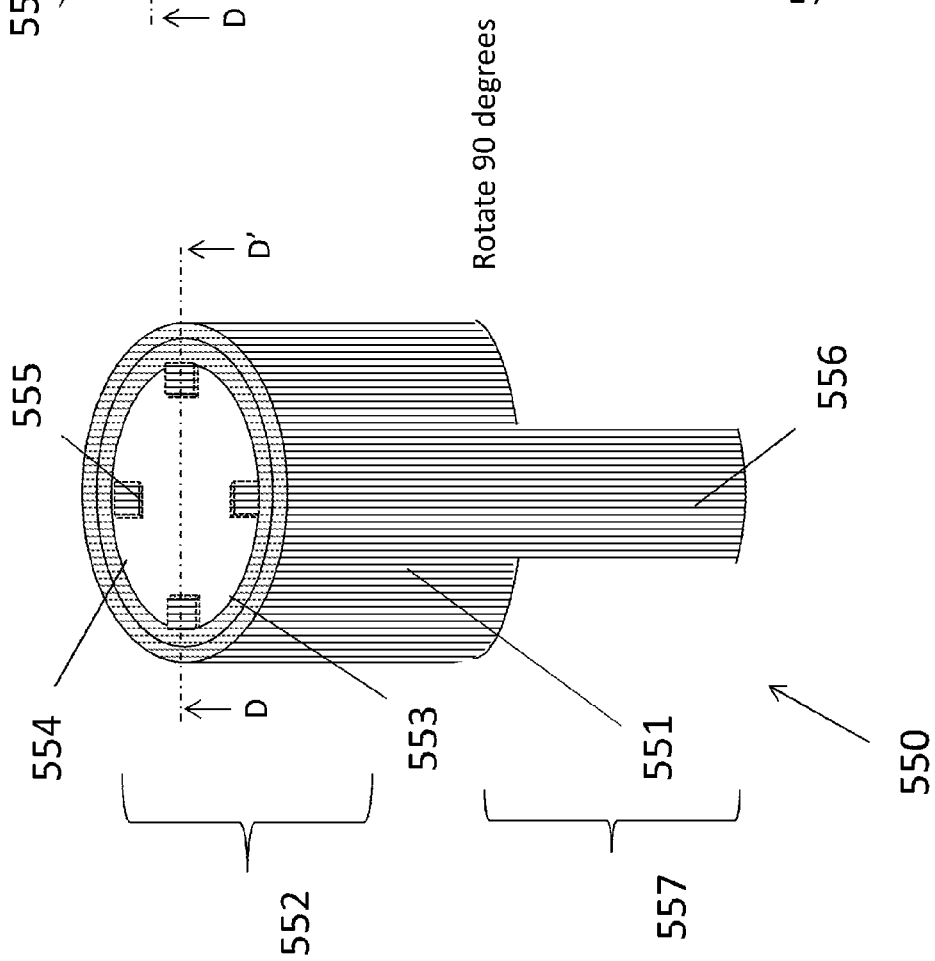

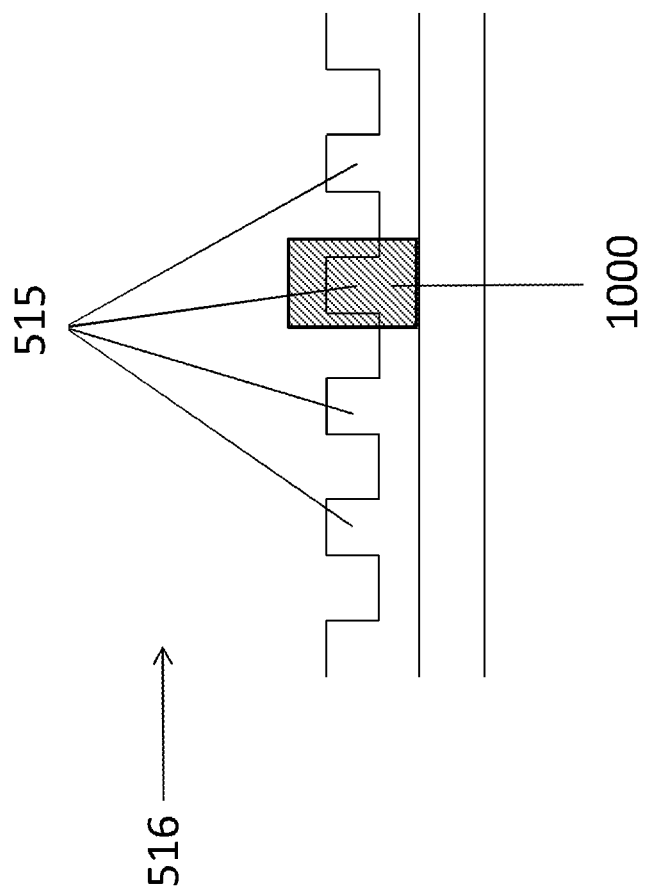

ROTARY DIAL ASSEMBLY

BACKGROUND

1. Field of the Disclosure

The present disclosure relates to the field of rotary dials. More particularly, the present disclosure relates to rotary dial assemblies that control selection of various vehicle functions and display of the selected vehicle function.

2. Background Information

Conventionally, rotary dial assemblies have been known to include dial knobs that are rotatable into a plurality of positions that respectively correspond to a plurality of vehicle functions. The dial knob includes one or more types of indicia or graphics printed on an upper surface thereof to identify to the operator the vehicle function and/or the state of that vehicle function. When the dial knob is rotated into position, the printed indicia/graphics visually indicate to the operator the corresponding state of the vehicle function.

For example, as shown in FIG. 10A, the word "A/C" is printed on a rotatable dial knob to represent that the dial knob controls the air conditioning function of the vehicle and that the A/C can either be in an OFF state or an ON state. When the dial knob is rotated from the OFF state position to the ON state position, the printed indicia/graphics visually indicate to the operator that the A/C is ON.

Rotary dial assemblies have also been known to be illuminated at their upper surface to visually indicate to the operator the corresponding state of the vehicle function. To visually indicate the selected vehicle function and/or state of the vehicle function, various indicia/graphics disposed on the upper surface of the assembly are divided into distinct sections and each section is associated with a corresponding light emitting diode (LED) such that when a dial knob of the assembly is rotated to a given position, the LED corresponding to the selected vehicle function is powered to project back light illumination to the corresponding distinct section associated with the selected vehicle function. However, complex logic circuit or microcontroller software is necessary to control the relationship between the dial knob and the LED light function.

For example, as shown in FIG. 10B, a rotatable dial assembly includes three graphical symbols at the upper surface thereof to represent various air conditioning (A/C) functions of the vehicle such as directing air towards a passenger's face or towards a passenger's feet. Each graphical symbol is divided into a distinct section (section 1, 2, or 3) on the upper surface of the assembly. When a dial knob is rotated to a given position, the LED light function may allow: (a) illumination of sections 1, 2 and 3 of the assembly to indicate that the A/C will blow air toward both the face and the feet of the passenger; (b) illumination of sections 1 and 2 of the assembly to indicate that the A/C will blow air toward the face of the passenger; or (c) illumination of sections 1 and 3 to indicate that the A/C will blow air toward the feet of the passenger.

3. Summary of the Disclosure

With such existing designs, there is a need for an improved rotary dial assembly that simply and clearly displays multiple vehicle functions and/or selected states of a vehicle function.

According to non-limiting embodiments of the present application, a rotary dial assembly is provided. The rotary dial assembly may include a rotary dial configured to selectively display a plurality of graphical images, and a polarized film assembly disposed in the rotary dial and configured to control the selective displaying of the plurality of graphical images on the rotary dial. When the rotary dial is rotated the polarized film assembly may be illuminated such that at least one of the plurality of graphical images is displayed on the rotary dial assembly.

In embodiments, the plurality of graphical images includes a first graphical image and a second graphical image. When the rotary dial is rotated by a first rotation amount the first graphical image is displayed on the rotary dial assembly, and when the rotary dial is rotated by a second rotation amount the second graphical image is displayed on the rotary dial assembly.

In embodiments, the polarized film assembly includes a first polarized film section and a second polarized film section where the first polarized film section is spaced from the second polarized film section along a rotation axis of the rotary dial, and when the rotary dial is rotated one of the first polarized film section and the second polarized film section is rotated relative to the other of the first polarized film section or the second polarized film section.

In embodiments, the polarized film assembly includes a first polarized film section and a second polarized film section, where the first polarized film section is spaced from the second polarized film section along a rotation axis of the rotary dial. The first polarized film section is a multilayer film and includes at least two absorbing polarized film layers. Each film layer includes one of the plurality of graphical images. Each film layer has a film layer polarization orientation and each film layer polarization orientation is oriented 90° from another film layer polarization orientation of another film layer and the first polarized film section is stacked along the rotation axis of the rotary dial. The second polarized film section includes an absorbing polarized film having an absorbing polarized film polarization orientation oriented 90° from one of the film layer polarization orientations of one of the absorbing polarized film layers of the first polarized film section. The second polarized film section is provided on the rotation axis of the rotary dial at a position below the first polarized film section, and when the rotary dial is rotated the first polarized film section is rotated relative to the second polarized film section such that at least one of the graphical images is displayed on the rotary dial assembly.

In embodiments, the polarized film assembly includes a first polarized film section and a second polarized film section, where the first polarized film section is spaced from the second polarized film section along a rotation axis of the rotary dial. The first polarized film section is a multilayer film and includes at least one absorbing polarized film layer including the plurality of graphical images. Each film layer has a film layer polarization orientation and each film layer polarization orientation is oriented 90° from another film layer polarization orientation of another film layer. The first polarized film section is stacked along the rotation axis of the rotary dial. The second polarized film section includes an absorbing polarized film having an absorbing polarized film polarization orientation that is provided on the rotation axis of the rotary dial at a position below the first polarized film section, and when the rotary dial is rotated the polarization orientation of the second polarized film section is rotated relative to the film layer polarization orientation of each film layer on the at least one absorbing polarized film layer such that at least one of the graphical images is displayed on the rotary dial assembly.

In embodiments, the rotary dial assembly includes a light source provided below the polarized film assembly and configured to pass light through the polarized film assembly to display at least the one of the plurality of graphical images on the rotary dial and when the rotary dial is rotated the light source is illuminated to display at least one of the plurality of graphical images on the rotary dial assembly.

In embodiments, the plurality of graphical images includes a first graphical image and a second graphical image. When the rotary dial is rotated by a first rotation amount the first graphical image is displayed on the rotary dial assembly. When the rotary dial is rotated by a second rotation amount the first graphical image and at least a portion of the second graphical image are displayed on the rotary dial assembly. When the rotary dial is rotated by a third rotation amount the second graphical image is displayed on the rotary dial assembly.

In embodiments, the rotary dial assembly includes a film holder that supports a first polarized film section of the polarized film assembly, where the first polarized film section is a multilayer film that includes at least one absorbing polarized film layer including the plurality of graphical images. A lower housing is provided and is configured to rotatably support the rotary dial and secure the film holder in a fixed state such that the rotary dial is rotatable relative to the film holder. An upper housing is provided and configured to cover the lower housing and a portion of the rotary dial.

In embodiments, the film holder includes a tubular main body provided at an upper side of the film holder, an annular flange disposed on an inner circumferential surface of the tubular main body configured to support the first polarized film section of the polarized film assembly, and a plurality of annular wall sections extending from the tubular main body toward a lower side of the film holder. The annular wall sections are spaced from each other in a circumferential direction of the film holder to permit rotation of the rotary dial.

In embodiments, the rotary dial includes a tubular housing configured to surround the film holder in a concentric manner such that the tubular housing is rotatable relative to the film holder, and at least one protrusion that projects inwardly from an inner circumferential surface of the tubular housing in a direction perpendicular to a rotation axis of the rotary dial. The at least one protrusion supports a second polarized film section of the polarized film assembly and the second polarized film section including an absorbing polarized film. The second polarized film section is positioned below the first polarized film section along the rotation axis of the rotary dial, and when the rotary dial is rotated the second polarized film section is rotated relative to the first polarized film section supported by the film holder.

In embodiments, the rotary dial includes a tubular housing configured to surround the film holder in a concentric manner such that the tubular housing is rotatable relative to the film holder, and at least one protrusion that projects inwardly from an inner circumferential surface of the tubular housing in a direction perpendicular to a rotation axis of the rotary dial. The at least one protrusion supports a second polarized film section of the polarized film assembly, where the at least one protrusion of the rotary dial projects between at least two of the spaced annular wall sections of the film holder such that the second polarized film section is aligned with the first polarized film section along the rotation axis of the rotary dial, and when the rotary dial is rotated the spacing between the at least two annular wall sections permits the at least one protrusion and the second polarized film section to rotate relative to the film holder and the first polarized film section.

In embodiments, the tubular housing includes a plurality of notches provided along an outer circumferential surface of the rotary dial at a lower end thereof. The plurality of notches are configured to communicate with a photo interrupter that detects an amount of rotation of the rotary dial.

In embodiments, the lower housing includes a first support groove that supports a lower end of the film holder, a second support groove that supports a lower end of the rotary dial, a first wall that is configured to support a circuit board and a light source, and a second wall that is configured to house a biasing member that is removably biased into a plurality of detents on an outer circumferential surface of the rotary dial.

In embodiments, the upper housing includes an opening at an upper side thereof such that an upper portion of the tubular housing of the rotary dial extends upward from the lower housing and through the opening. The rotary dial is rotatable relative to the upper housing. The at least one protrusion and the second polarized film section of the polarized film assembly are disposed below the opening within the upper housing, and at least a portion of the film holder that supports the first polarized film section of the polarized film assembly is disposed above the opening of the upper housing.

In embodiments, the rotary dial assembly includes a light source that is provided on a rotation axis of the rotary dial below the polarized film assembly and configured to pass light through the polarized film assembly, and when the rotary dial is rotated and the biasing member is biased into one of the plurality of detents on the rotary dial the light source is illuminated such that at least one of the plurality of graphical images is displayed on the rotary dial assembly.

In embodiments, the first polarized film section is a multilayer film and includes a first absorbing polarized film layer including a first graphical image and a second absorbing polarized film layer including a second graphical image. Each absorbing polarized film layer has a film layer polarization orientation and the film layer polarization orientation of the first absorbing polarized film layer is oriented 90° from the film layer polarization orientation of the second polarized graphic image layer and the first polarized film section is stacked along the rotation axis of the rotary dial. The second polarized film section includes an absorbing polarized film having a polarization orientation that is provided on the rotation axis of the rotary dial at a position below the first polarized film section, and when the rotary dial is rotated the polarization orientation of the second polarized film section is rotated relative to the film layer polarization orientation of each absorbing polarized film layer such that at least one of the first and second graphical images is displayed on the rotary dial assembly.

In embodiments, the plurality of graphical images includes a first graphical image and a second graphical image. When the rotary dial is rotated by a first rotation amount the first graphical image is displayed on the rotary dial assembly. When the rotary dial is rotated by a second rotation amount the first graphical image and at least a portion of the second graphical image are displayed on the rotary dial assembly. When the rotary dial is rotated by a third rotation amount only the second graphical image is displayed on the rotary dial assembly.

According to the various embodiments of the rotary dial assembly, multiple graphics may be easily displayed in a convenient orientation based on a rotation of the rotary dial to visually indicate to the operator the vehicle function and/or state of the vehicle function. The configuration of the rotary dial assembly is simplified so as to reduce manufacturing time and cost, as well as to minimize the complexity of readily displaying a selected vehicle function and/or state of the vehicle function by simplifying the control requirements of the light source, e.g., limiting the necessity for complex LED power control logic circuits and/or microcontrollers. The configuration of the assembly also advantageously allows for the multiple graphics to be displayed singularly, alternately and repeatedly, or partially or fully superimposed simultaneously.

Other aspects and advantages of the present disclosure will become apparent from the following description taken in conjunction with the accompanying drawings, illustrated by way of example, the spirit of the invention.

BRIEF DESCRIPTION OF THE DRAWINGS

The novel features which are characteristic of the various embodiments of the assembly, both as to structure and method of operation thereof, together with further aims and advantages thereof, will be understood from the following description, considered in connection with the accompanying drawings, in which embodiments of the assembly are illustrated by way of example. It is to be expressly understood, however, that the drawings are for the purpose of illustration and description only, and they are not intended as a definition of the limits of the assembly. For a more complete understanding of the disclosure, as well as other aims and further features thereof, reference may be had to the following detailed description of the disclosure in conjunction with the following exemplary and non-limiting drawings wherein:

FIG. 1A shows a partial plan view of an exemplary, non-limiting embodiment of a rotary dial assembly in a first rotation state, according to aspects of the present disclosure.

FIG. 1B shows the rotary dial assembly of FIG. 1A in a second rotation state, according to aspects of the present disclosure.

FIG. 1C shows a partial exploded view of an exemplary, non-limiting embodiment of a polarized film assembly including graphical images, according to aspects of the present disclosure.

FIG. 2A is a schematic of an exemplary, non-limiting example of a polarized film assembly in a first rotation state, according to aspects of the present disclosure.

FIG. 2B is a schematic of an exemplary, non-limiting example of the polarized film assembly in a second rotation state, according to aspects of the present disclosure.

FIG. 3A shows a partial plan view of another exemplary, non-limiting embodiment of a rotary dial assembly in a first rotation state, according to aspects of the present disclosure.

FIG. 3B shows a partial plan view of the rotary dial assembly of FIG. 3A in a second rotation state, according to aspects of the present disclosure.

FIG. 3C shows a partial plan view of the rotary dial assembly of FIG. 3A in a third rotation state, according to aspects of the present disclosure.

FIG. 4A shows a partial perspective view of another exemplary, non-limiting example of an orientation of a polarized film section in a first rotation state, according to aspects of the present disclosure.

FIG. 4B shows the polarized film section of FIG. 4A in a second rotation state, according to aspects of the present disclosure.

FIG. 5B shows a partial cross-sectional view of the rotary dial assembly of FIG. 5A along line A-A, according to aspects of the present disclosure.

FIG. 5C show a partial cross-sectional view of the rotary dial assembly of FIG. 5A along line B-B, according to aspects of the present disclosure.

FIG. 7A shows a perspective view of an exemplary, non-limiting embodiment of a rotary dial, according to aspects of the present disclosure.

FIG. 7B shows a plan view of the rotary dial of FIG. 7A, according to aspects of the present disclosure.

FIG. 8A shows a perspective view of an exemplary, non-limiting embodiment of a film holder in a first rotation state, according to aspects of the present disclosure.

FIG. 8B shows the film holder of FIG. 8A in a second rotation state, according to aspects of the present disclosure.

FIG. 9 shows a partial cross sectional view of an exemplary, non-limiting embodiment of a photo interrupter and notches of a rotary dial, according to aspects of the present disclosure.

DETAILED DESCRIPTION

Figure 5A:
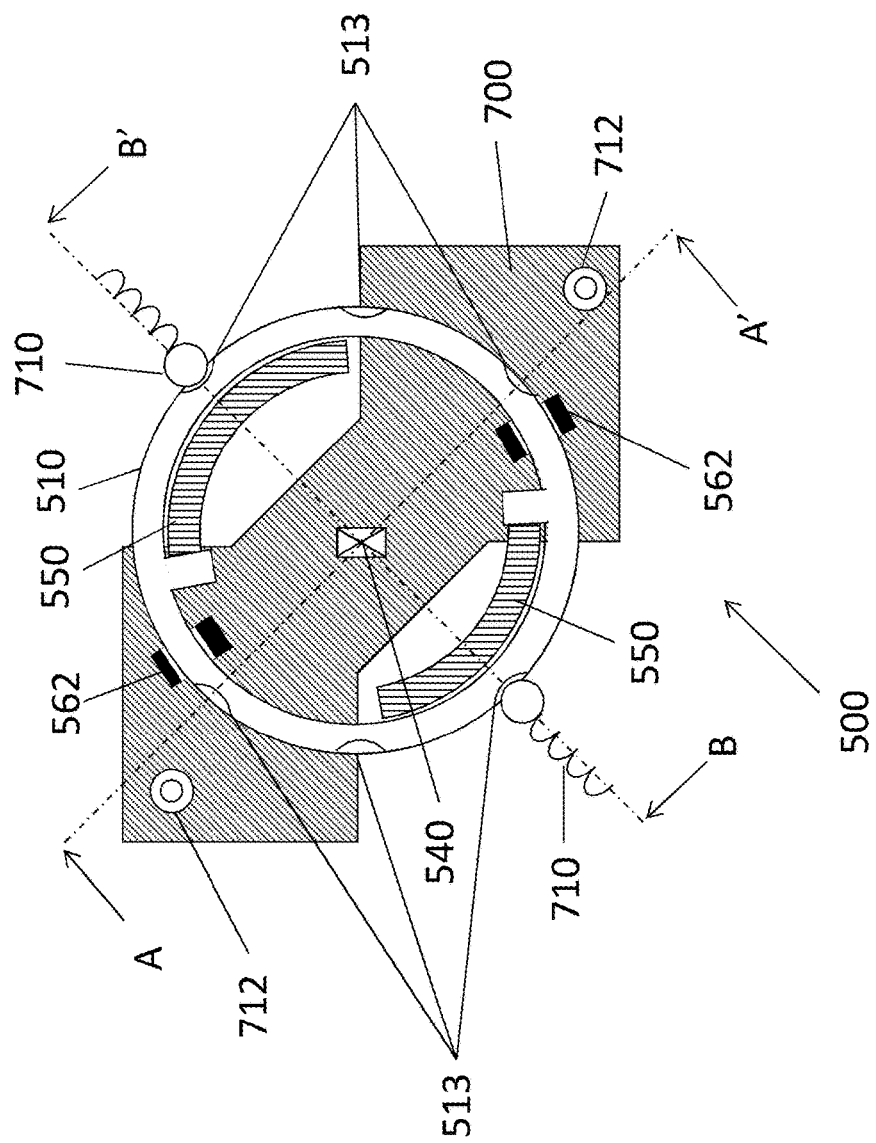
FIG. 5A shows a partial plan view of an exemplary, non-limiting embodiment of a rotary dial assembly, according to aspects of the present disclosure.

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

FIGS. 1A and 1B show a rotary dial assembly 1 in two rotation states. To change the rotation state, the rotary dial assembly 1 includes a rotary dial 100 that is configured to selectively display a first graphical image 200a and a second graphical image 200b on an upper surface 10 of the rotary dial assembly 1. When the rotary dial 100 is in a first rotation state (or when the rotary dial 100 is rotated by a first rotation amount), the first graphical image 200a is displayed on the upper surface 10 of the rotary dial assembly 1 to be visualized by an operator, and in a second rotation state (or when the rotary dial 100 is rotated by a second rotation amount), the first graphical image 200a is effectively blocked from view and the second graphical image 200b is displayed on the upper surface 10 of the rotary dial assembly 1. For example, the rotary dial assembly 1 may be a drive mode selector device provided in a vehicle interior cabin to control and conveniently display a selected drive mode function (e.g., an "ECO" mode or a "SPORT" mode as shown in FIGS. 1A and 1B, respectively).

When the rotary dial 100 is rotated by the first rotation amount (or is in the first rotation state), the ECO mode can be selected and visualized via the "ECO" graphical image 200a, and when the rotary dial 100 is rotated by a second rotation amount (or is in the second rotation state), the ECO mode image is blocked and the SPORT mode can be selected and visualized via the "SPORT" graphical image 200b.

The rotary dial assembly 1 also includes a polarized film assembly 300 disposed in the rotary dial 100 to control which of the first and second graphical images 200a-b is selectively displayed on the upper surface 10 of the rotary dial assembly 1. As shown in FIG. 1C, the polarized film assembly 300 includes two different graphics, each have an orientation that is offset by a rotation angle (e.g., 90°) from the other. When the rotary dial 100 is rotated to either the first rotation state (FIG. 1A) or the second rotation state (FIG. 1B), the polarized film assembly 300 is illuminated such that one of the two graphical images 200a, 200b is displayed on the upper surface 10 of the rotary dial assembly 1.

Thus, as shown, e.g., in FIGS. 1A and 1B, the polarized film assembly 300 is configured such that only the ECO mode image at 200a or the SPORT mode image at 200b, whichever image is in an upright, horizontal orientation relative to the other image, is displayed on the upper surface 10 of the rotary dial assembly 1. While two graphical images are shown for illustration purposes, it is contemplated that three or more graphical images could be provided on the polarized film assembly 300 to provide an operator of the rotary dial 100 with more vehicle function options and states to select and display.

FIGS. 2A and 2B show a partial exploded cross-sectional view of the polarized film assembly 300 in the first rotation state and the second rotation state. The polarized film assembly 300 includes a first polarized film section 310 and a second polarized film section 320. The first polarized film section 310 and the second polarized film section 320 are stacked along a rotation axis 130 of the rotary dial 100. The first polarized film section 310 is also spaced from the second polarized film section 320 along the rotation axis 130 of the rotary dial 100. The distance or spacing between the first polarized film section 310 and the second polarized film section 320 along the rotation axis 130 is not particularly limited so long as the first polarized film section 310 can be readily illuminated (as will be discussed in detail below) to display the graphical images 200a, 200b.

When the rotary dial 100 is rotated, the first polarized film section 310 is rotated relative to the second polarized film section 320. In particular, the first polarized film section 310 rotates with the rotation of the rotary dial 100 and the second polarized film section 320 remains stationary (or fixed) within the polarized film assembly 300. This arrangement allows only one of the two graphical images 200a, 200b to be displayed on the upper surface 10 of the rotary dial assembly 1 at each rotation state.

In addition to the rotary dial 100 and the polarized film assembly 300, the rotary dial assembly 1 further includes a light source 330. The light source 330 is provided below the polarized film assembly 300. As shown in FIGS. 2A and 2B, the light source 330 includes an LED light 332. The LED light 332 is provided below the second polarized film section 320 and spaced from the second polarized film section 320 along the rotation axis 130 of the rotary dial 100. The distance or spacing between the second polarized film section 320 and the light source 330 along the rotation axis 130 is not particularly limited so long as the light passing through the second polarized film section 320 can readily illuminate the first polarized film section 310 to display one of the graphical images 200a, 200b. While the light source 330 is described above as being an LED light source, it is contemplated that the light source 330 may be any suitable light source capable of illuminating the film layers to display the graphical images on the upper surface 10 of the rotary dial assembly 1. In addition, the color emitted from the light source 330 is not particularly limited (e.g., blue, yellow, red, purple, green, orange, white, pink, etc . . . ) so long as the colored light passing through the second polarized film section 320 can readily illuminate the first polarized film section 310 to display one of the graphical images 200a, 200b.

In the polarized film assembly 300, the first polarized film section 310 is a multilayer film including at least two stacked films, each one having one of the graphical images 200a, 200b. The multilayer film also includes a diffusion layer 314 and a smoke layer 316. When the first polarized film section 310 is assembled, the diffusion layer 314 is disposed between the smoke layer 316 and the first polarized film section 310 in the height direction of the rotary dial assembly 1. The diffusion layer 314 and the smoke layer 316 are stacked above the first polarized film section 310 so as to improve the quality of the image seen by the operator. In this regard, the diffusion layer 314 is provided so as to spread light through the entire graphical image for the purpose of ensuring that each graphical image 200a, 200b appears evenly illuminated on the upper surface 10 of the rotary dial assembly 1.

When the light source 330 illuminates the first polarized film section 310, some of the emitted light can leak from the graphical image not being displayed and may lead to undesirable ghosting effects or distortion of the graphical image being displayed. Thus, the smoke layer 316 is provided to reduce the effect of any light leakage from the graphical image not being displayed to ensure that only the one graphical image is displayed in any given rotation state as described above.

The material of the first polarized film section 310 is not particularly limited and may have transparent, opaque and light blocking sections and may come in a single color or a variety of colors to enhance the visual effect when the graphical images are displayed on the upper surface 10 of the rotary dial assembly 1. The materials of the diffusion layer 314 and the smoke layer 316 are also not particularly limited and may have characteristics suitable to enhance the display of the various graphical images described above to improve the quality of the image seen by the operator on the rotary dial assembly 1.

While four layers (including the two stacked films each having one of graphical image 200a and 200b) of the first polarized film section 310 are shown for illustration purposes, it is contemplated that a single absorbing polarized film layer could be provided or five or more layers could be provided (including additional interchangeable absorbing polarized film layers including graphical images, protective film layers, color enhancing film layers, or any additional film layers that control light transmission, reflection and refraction to enhance the images being displayed). Further, it is contemplated that the graphical images 200a, 200b included on the first polarized film section 310 may be printed or laser etched thereon, or a non-polarized section of the film layer itself. It is contemplated that any other known method or combination of known methods for creating an image on a polarized film may also be employed.

As shown in FIG. 1C, the graphical images 200a, 200b are oriented in the polarized film assembly 300 such that each graphical image 200a, 200b is offset from the other by 90°. In this case, the "ECO" mode image is positioned in an upright, horizontal manner, while the "SPORT" mode image is oriented in a vertical manner. When the rotary dial 100 is rotated 90°, the orientation of both images is changed such that the "ECO" mode image is positioned in the vertical manner, while the "SPORT" mode image is oriented in the upright, horizontal manner.

In addition, each graphical image 200a, 200b is included on a film layer having a film layer polarization orientation 202a, 202b that is offset 90° from the film layer polarization orientation of the other film layer. For example, as shown in FIG. 2A, in the first rotation state the first graphical image 200a has a film layer polarization orientation 202a at 90° and the second graphical image 200b has a film layer polarization orientation 202b at 0° that is offset 90° from the film layer polarization orientation 202a of the first graphical image 200a. In the second rotation state and as shown in FIG. 2B, the first graphical image 200a has a film layer polarization orientation 202a at 0° and the second graphical image 200b has a film layer polarization orientation 202b at 90° that is offset 90° from the film layer polarization orientation 202a of the first graphical image 200a.

The second polarized film section 320 also has a film layer polarization orientation 320a. As shown in FIGS. 2A and 2B, the film layer polarization orientation 320a is fixed at 0° since the second polarized film section 320 is fixed within the polarized film assembly 300 relative to the rotatable films of the first polarized film section 310 including the graphical images 200a, 200b. According to this arrangement, only one of the graphical images is displayed on the upper surface 10 of the rotary dial assembly 1 for each rotation state.

In particular, and as shown in FIG. 2A, in the first rotation state, since the film layer polarization orientations of the second polarized film section 320 and the graphical image 200b are aligned (or parallel) at 0°, light from the LED light 332 passes through the polarized film section 320 and the second graphical image 200b (and blocked by the polarized portion of the film layer including the first graphical image 200a) so that the first graphical image 200a is displayed on the upper surface 10 of the rotary dial assembly 1, and the second graphical image 200b is prevented from being displayed. It is noted that the graphical image 200a is a non-polarized portion of the film layer on which it is included. Put another way, in the first rotation state and when the LED light is turned ON, light passes through the second polarized film section 320 and the second graphical image 200b but blocked (or absorbed) by the film layer of the first graphical image 200a due to the 90° offset in orientation of the polarized film layers so that the first graphical image 200a is displayed.

Similarly, in the second rotation state and as shown in FIG. 2B since the polarization orientations of the second polarized film section 320 and the graphical image 200a are aligned (or parallel) at 0°, light from the LED light 332 passes through the polarized film section 320 and the first graphical image 200a so that the second graphical image 200b is displayed on the upper surface 10 of the rotary dial assembly 1, and the first graphical image 200a is prevented from being displayed. That is, in the first rotation state and when the LED light is turned ON, light passes through the second polarized film section 320 and the film layer of the first graphical image 200a but blocked (or absorbed) by the film layer of the second graphical image 200b due to the 90° offset in orientation of the polarized film layers so that the second graphical image 200b is displayed. Here, the graphical image 200b is also a non-polarized portion of the film layer on which it is included.

Such a configuration enables the rotary dial assembly 1 to selectively display one of the plurality of graphical images on the rotary dial assembly 1 so as to more simply and clearly display the vehicle function and/or state of the vehicle function to the operator.

FIGS. 3A-C show a rotary dial assembly 500 including graphical images 501a, 501b, 501c projecting from an upper surface 503 of the rotary dial assembly 500 at three different rotation states of the rotary dial assembly 500. The rotary dial assembly 500 includes a rotary dial 510 configured to selectively display the graphical images 501a, 501b, 501c, and a polarized film assembly 520 disposed in the rotary dial 510 and configured to control the selective displaying of graphical images 501a, 501b, 501c on the upper surface 503 of the rotary dial assembly 500. When the rotary dial 510 is rotated, the polarized film assembly 520 is illuminated such that at least one of graphical images 501a, 501b, 501c is displayed on the upper surface 503 of the rotary dial assembly 500.

As shown in FIGS. 5B and 5C, the polarized film assembly 520 includes a first polarized film section 522 and a second polarized film section 524. The first polarized film section 522 is spaced from the second polarized film section 524 along a rotation axis 530 of the rotary dial 510.

In addition to the rotary dial 510 and the polarized film assembly 520, the rotary dial assembly 500 also includes a light source 540, for example an LED light 542, provided below the polarized film assembly 520 and configured to pass light through the polarized film assembly 520 to display at least one of the graphical images 501a, 501b, 501c on the upper surface 503 of the rotary dial assembly 500. In addition, in this embodiment, the color emitted from the light source 540 is also not particularly limited (e.g., blue, yellow, red, purple, green, orange, white, pink, etc . . . ) so long as the colored light passing through the polarized film assembly 520 can readily display the graphical images 501a, 501b, 501c.

When the rotary dial 510 is rotated, the light source 540 is illuminated to display at least one of graphical images 501a, 501b, 501c on the rotary dial 510. The graphical images 501a, 501b, 501c are selectively displayed on the upper surface 503 of the rotary dial assembly 500 based on a relative polarization orientation of the first polarized film section 522 and the second polarized film section 524.

As shown in FIGS. 4A and 4B, the first polarized film section 522 is a multilayer film and includes a first graphic polarized film 522a and a second graphic polarized film 522b. The films 522a, 522b can be a single absorbing polarized film layer including graphical images 501a and 501c, or two absorbing polarized film layers, each layer having one of the graphical images 501a, 501c. The first graphic polarized film 522a and the second graphic polarized film 522b are stacked along the rotation axis 530 of the rotary dial 510. The multilayer film also includes the diffusion layer 314 and the smoke layer 316 similar to the other described non-limiting embodiments. In particular, when the first polarized film section 522 is assembled, the diffusion layer 314 is disposed between the smoke layer 316 and the first polarized film section 522 in the height direction of the rotary dial assembly 1. The diffusion layer 314 and the smoke layer 316 are stacked above the first polarized film section 522 so as to improve the quality of the image seen by the operator. In this regard, the diffusion layer 314 is provided so as to spread light through the entire graphical image for the purpose of ensuring that each graphical image 501a, 501b and 501c appears evenly illuminated. When the light source 540 illuminates the first polarized film section 522, some of the emitted light can leak from the graphical image(s) not being displayed and may lead to undesirable ghosting effects or distortion of the displayed image. Thus, the smoke layer 316 is provided to reduce the effect of any light leakage from the graphical image not being displayed to ensure that only the one graphical image is clearly displayed in any given rotation state as described above.

The material of the first polarized film section 522 is not particularly limited and may have transparent, opaque and light blocking sections and may come in a single color or a variety of colors to enhance the visual effect when the graphical images are displayed on the upper surface 503 of the rotary dial assembly 500. The materials of the diffusion layer 314 and the smoke layer 316 are also not particularly limited and may have characteristics suitable to enhance the display of the various graphical images described above to improve the quality of the image seen by the operator on the rotary dial assembly 500.

While four layers (including the two stacked films each having one of graphical images 501a and 501c) of the first polarized film section 522 are shown for illustration purposes, it is contemplated that a single absorbing polarized film layer could be provided or five or more layers could be provided (including additional interchangeable absorbing polarized film layers including graphical images, protective film layers, color enhancing film layers, or any additional film layers that control light transmission, reflection and refraction to enhance the images being displayed). Further, it is contemplated that the graphical images 501a, 501c included on the first polarized film section 522 may be printed or laser etched thereon, or a non-polarized section of the film layer itself. It is contemplated that any other known method or combination of known methods for creating an image on a polarized film may also be employed.

As shown in FIG. 4A, the first graphic polarized film 522a includes graphical image 501a and has a film layer polarization orientation 522a'. As shown in FIG. 4B, the second graphic polarized film 522b includes graphical image 501c and has a film layer polarization orientation 522b' that is offset 90° from the film layer polarization orientation 522a' of the first graphic polarized film 522a. The second polarized film section 524 includes an absorbing polarized film 524a having a film layer polarization orientation 524a'. The second polarized film section 524 is provided on the rotation axis 530 of the rotary dial 510 at a position below the first polarized film section 522.

When the rotary dial 510 is rotated by a first rotation amount (e.g., 45°), or set in a first rotation state, graphical image 501c is blocked from view and graphical image 501a is displayed on the upper surface 503 of the rotary dial assembly 500 as shown in FIG. 3A. That is, when the film layer polarization orientation 524a' of the second polarized film 524 is orthogonal to the film layer polarization orientation 522a' of the first graphic polarized film 522a, the graphical image 501a is displayed on the upper surface 503 of the rotary dial assembly 500 and the graphical image 501c of the second graphic polarized film 522b is blocked from view (since the film layer polarization orientation 522b' of the second graphic polarized film 522b is aligned (or parallel) to the film layer polarization orientation 524a' of the second polarized film section 524a). It is noted that the first graphical image 501a displayed on the upper surface 503 of the rotary dial assembly 500 is based on the graphic included on the first graphical polarized film 522a. It is also noted that each of the graphical images 501a and 501c is a non-polarized portion of the film layer on which it is included.

When the rotary dial 510 is rotated by a second rotation amount (e.g., another 45°) or set in a second rotation state, graphical image 501a and at least a portion of graphical image 501c are displayed on the upper surface 503 of the rotary dial assembly 500 as graphical image 501b as shown in FIG. 3B. That is, when the film layer polarization orientation 524a' of the second polarized film 524 is offset by 45° relative to the film layer polarization orientation 522a' of the first graphic polarized film 522a and the film layer polarization orientation 522b' of the second graphic polarized film 522b, graphical image 501a and at least a portion of graphical image 501c are displayed on the upper surface of the rotary dial assembly 500.

As the rotary dial 510 is rotated, the change in orientation of the second polarized film 524 relative to the first and second graphic polarized films 522a, 522b allows graphical image 501c to be gradually shown on the upper surface 503 of the rotary dial assembly 500 (and graphical image 501a to gradually disappear or become transparent). When the orientation offset is 45°, both graphical image 501a and at least the portion of graphical image 501c are shown on the upper surface 503 of the rotary dial assembly 500 with the same brightness in the second rotation state. Here, it is noted that the portion of graphical image 501c displayed on the upper surface 503 of the rotary dial assembly 500 is based on the graphic included on the second graphical polarized film 522b. It is also noted that while graphical image 501a remains shown in the second rotation state, in other embodiments only a portion of the graphical image 501a may be shown and graphical image 501c may be entirely shown. Still in other embodiments, both graphical images 501a, 501c will be entirely shown together or both graphical images 501a, 501c may be both only partially shown.

When the rotary dial 510 is rotated by a third rotation amount (e.g., yet another 45°) or set into a third rotation state, the first graphical image 501a is blocked from view and the graphical image 501c is displayed on the upper surface 503 of the rotary dial assembly 500. That is, when the film layer polarization orientation 524a' of the second polarized film is orthogonal to the film layer polarization orientation 522b' of the second graphic polarized film 522b, the graphical image 501c is displayed on the upper surface 503 of the rotary dial assembly 500 and the graphical image 501a of the first graphic polarized film 522a is blocked from view (since the film layer polarization orientation 522a' of the first graphic polarized film 522a is aligned (or parallel) to the film layer polarization orientation 524a' of the second polarized film section 524a). As the rotary dial 510 is rotated, the change in orientation of the second polarized film 524 relative to the first and second graphic polarized films 522a, 522b allows graphical image 501c to be shown clearly on the upper surface 503 of the rotary dial assembly 500 (while graphical image 501a gradually disappears or becomes transparent) so that only the graphical image 501c is displayed in the third rotation state.

For example, the rotary dial assembly 500 may be an A/C air flow direction control device provided in a vehicle interior cabin to control and conveniently display a selected air flow direction mode (e.g., a foot air flow mode (FIG. 3A), a face and foot air flow mode (FIG. 3B), or a face air flow mode (FIG. 3C)). When the rotary dial 510 is rotated by the first rotation amount (into the first rotation state), the graphical image 501c, which corresponds to the face air flow mode, is blocked from view and the graphical image 501a, corresponding to the foot air flow mode 501a, is displayed on the upper surface 503 of the rotary dial assembly 500.

When the rotary dial 501 is rotated by the second rotation amount (into the second rotation state), the graphical image 501a of the foot air flow mode and at least a portion of the graphical image 501c of the face air flow mode are displayed on the upper surface 503 of the rotary dial assembly 500 as graphical image 501b, which corresponds to the face and foot air flow mode. When the rotary dial 510 is rotated by the third rotation amount (into the third rotation state), the graphical image 501a of the foot air flow mode is blocked from view and the graphical image 501c of the face air flow mode is displayed on the upper surface 503 of the rotary dial assembly 500.

Such a configuration enables the rotary dial assembly 500 to selectively display on the upper surface 503 thereof a larger range of vehicle functions and/or states of the vehicle function in a simple and clear manner.

FIG. 5A shows a partial plan view of the rotary dial assembly 500. FIG. 5B shows a partial cross-sectional view of the rotary dial assembly 500 of FIG. 5A along line A-A and FIG. 5C show a partial cross-sectional view of the rotary dial assembly 500 of FIG. 5A along line B-B.

As shown in FIGS. 5B and 5C, in addition to the rotary dial 510 and the polarized film assembly 520, the rotary dial assembly 500 includes a film holder 550 that supports the first and second graphic polarized films 522a, 522b shown in FIGS. 5A and 5B. The rotary dial assembly 500 also includes a lower housing 560 configured to rotatably support the rotary dial 510 and secure the film holder 550 in a fixed, stationary state such that the rotary dial 510 is rotatable relative to the film holder 550. The rotary dial assembly 500 further includes an upper housing 570 configured to cover the lower housing 560 and a portion of the rotary dial 510 along the rotation axis 530.

Figure 6:
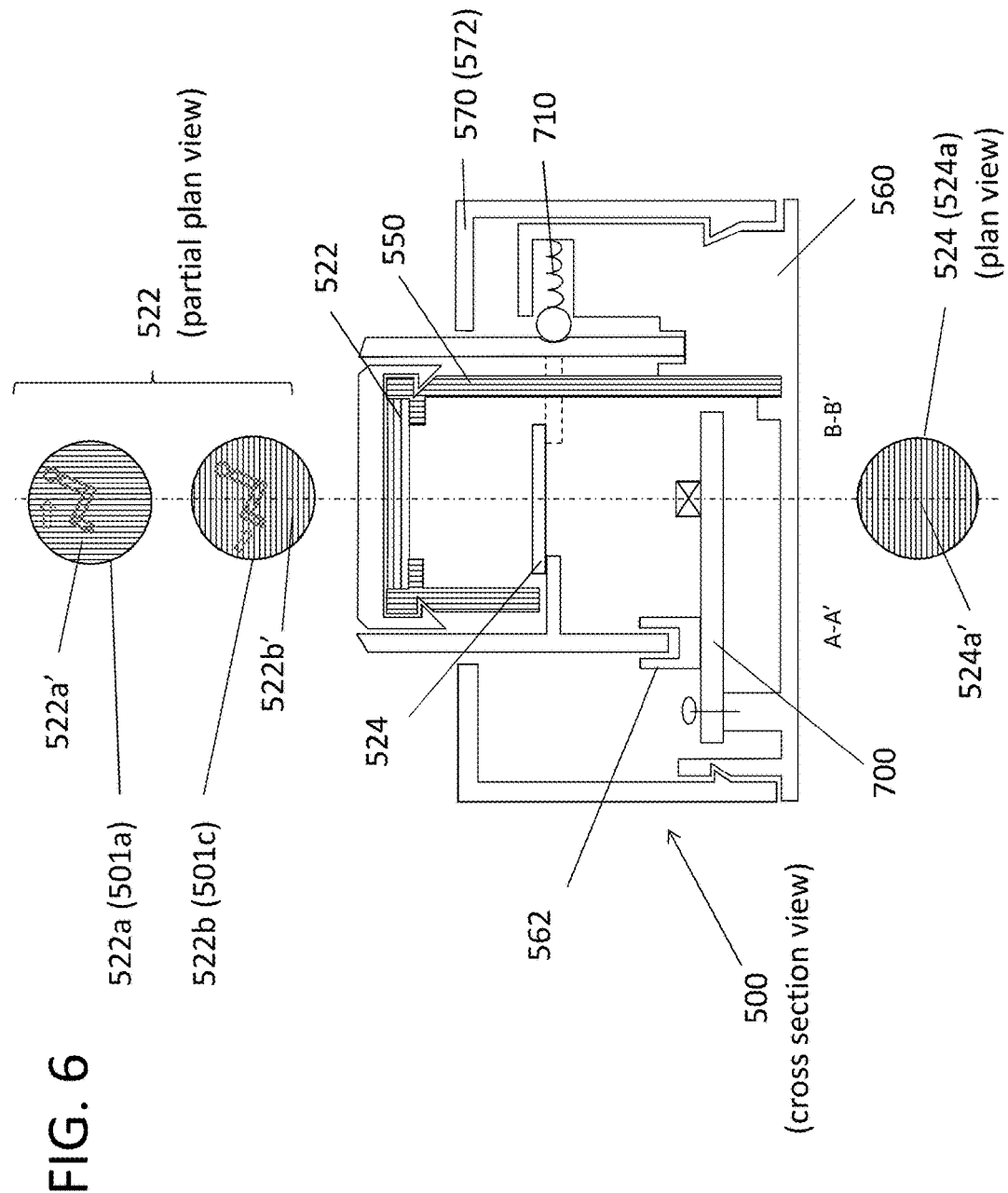
FIG. 6 shows the rotary dial assembly of FIG. 5A including partial exploded plan views of first and second polarized film sections, according to aspects of the present disclosure.
Figure 10A:
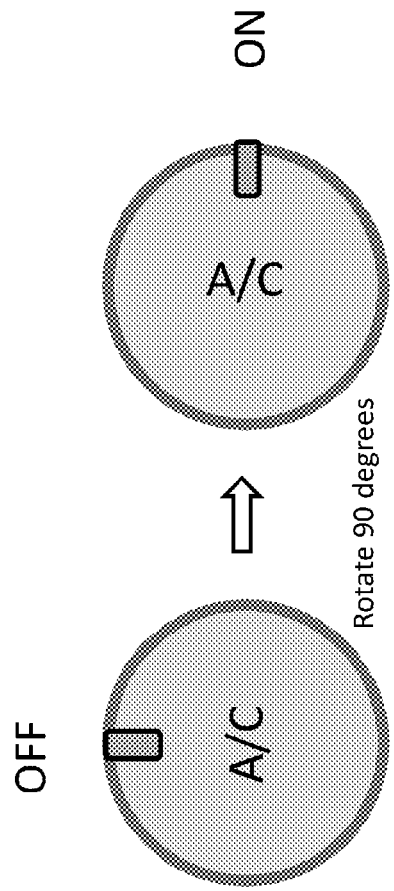
FIG. 10A is an example of a conventional dial knob with indicia printed thereon.
Figure 10B:
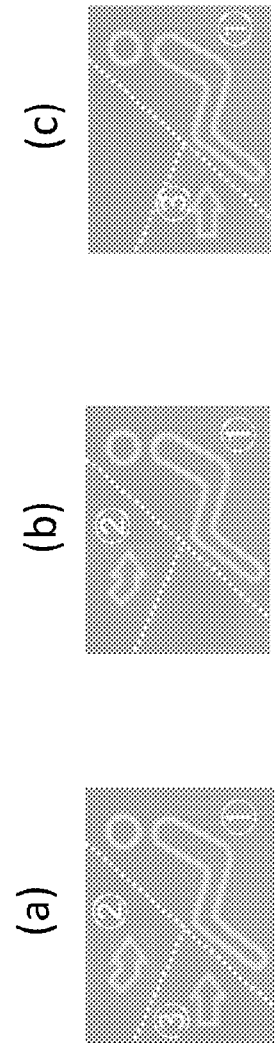
FIG. 10B is an example of graphical symbols disposed on an upper surface of a conventional dial knob.

FIG. 6 shows the rotary dial assembly 500 of FIGS. 5B and 5C, as well as partial exploded plan views of the first and second polarized film sections 522, 524 disposed inside the rotary dial 510. The arrangement of the first polarized film section 522 is shown as the first graphic polarized film 522a stacked on the second graphic polarized film 522b along the rotation axis 530 of the rotary dial 510 such that the film layer polarization orientation 522a' of the first graphic polarized film 522a is offset 90° from the film layer polarization orientation 522b' of the second graphic polarized film 522b. The second polarized film section 524 is shown as a single film layer having the film layer polarization orientation 524a' aligned with the film layer polarization orientation 522b' of the second graphic polarized film 522b. It is noted that the initial polarization orientation of the various film layers may be different than that shown so long as the rotary dial assembly 500 is still capable of selectively displaying the various graphical images as disclosed herein.

FIG. 7A shows a perspective view of the rotary dial 510 of the rotary dial assembly 500. FIG. 7B shows the rotary dial 510 of FIG. 7A along line C-C. The rotary dial 510 includes a tubular housing 511 configured to surround the film holder 550 in a concentric manner such that the tubular housing 511 is rotatable relative to the film holder 550. The rotary dial 510 also include two protrusions 512 that project inwardly from an inner circumferential surface 511a of the tubular housing 511 in a direction perpendicular to the rotation axis 530 of the rotary dial 510. The protrusions 512 support the second polarized film section 524 of the polarized film assembly 520 from a lower side of the second polarized film section 524. The protrusions 512 allow the second polarized film section 524 to stably rotate with the rotation of the rotary dial 510 about the rotation axis 530 and maintain a predetermined spacing between the light source 540 from a lower side thereof and the first polarized film section 522 above an upper side thereof.

It is noted that while the protrusions 512 extend radially inwardly from the inner circumferential surface 511a of the tubular housing 511 the protrusions 512 allow light from the light source 540 to illuminate the second polarized film section 524 without interfering with the ability of the graphical images 501a, 501b and 501c to be clearly displayed on the upper surface 503 of the rotary dial assembly 500.

When the rotary dial 510 is rotated, the second polarized film section 524 rotates with the rotary dial 510 relative to the first polarized film section 522 supported by (and fixed to) the stationary film holder 550. The rotary dial 510 also includes a plurality of detents 513 arranged around an outer circumferential surface 511b of the tubular housing 511 at an upper end 514 thereof and a plurality of notches 515 arranged around the outer circumferential surface 511b of the tubular housing 511 at a lower end 516 thereof.

FIG. 8A shows a perspective view of the film holder 550 of the rotary dial assembly 500 in a first rotation state. FIG. 8B shows the film holder 550 of FIG. 8A in a second rotation state. The film holder 550 includes a tubular main body 551 provided at an upper side 552 of the film holder 550. The film holder 550 also includes an annular flange 553 extending radially inward from an inner circumferential surface 554 of the tubular main body 551. The annular flange 553 is configured to fixedly support the first polarized film section 522 of the polarized film assembly 520.

In particular, the annular flange 553 supports the first polarized film section 522 from a lower side thereof so that the first polarized film section 522 remains fixed in place on the rotation axis 530 even when the rotary dial 510 is rotated relative to the film holder 550. In embodiments, the annular flange 553 includes extension supports 555 positioned at spaced intervals around the annular flange 553 and extend radially inward therefrom. It is noted that while the extension supports 555 extend radially inwardly from the annular flange 553 the extension supports 555 allow light from the light source 540 to illuminate the first polarized film section 522 without interfering with the ability of the graphical images 501a, 501b and 501c to be clearly displayed on the upper surface 503 of the rotary dial assembly 500.

The film holder 550 also includes two annular wall sections 556 extending from the tubular main body 551 toward a lower end 557 of the film holder 550. The annular wall sections 556 are spaced from each other in a circumferential direction of the film holder 550 to permit rotation of the rotary dial 510. The space between the annular wall sections 556 allows at least one change in rotation state of the rotary dial 510, and as shown in FIGS. 3A-3C, the spacing allows for three rotation states of the rotary dial 510.

As shown in FIG. 5B, the two protrusions 512 of the rotary dial 510 project between the spaced annular wall sections 556 of the film holder 550 such that the second polarized film section 524 is aligned with the first polarized film section 522 along the rotation axis 530 of the rotary dial 510. When the rotary dial 510 is rotated, the spacing between the two annular wall sections 556 permits the two protrusions 512 and the second polarized film section 524 to rotate relative to the film holder 550 and the first polarized film section 522 to allow the change in rotation state of the rotary dial 510.

As also shown in FIG. 5B, the lower housing 560 includes a first support groove 561 that supports the lower end 557 of the film holder 550, and a second support groove 562 that supports the lower end 516 of the rotary dial 510. The lower housing 560 also includes a first wall 563 that is configured to support a circuit board 700 and the light source 540, and a second wall 564 that is configured to house a biasing member 710 that is removably biased into the plurality of detents 513 (each detent 513 being associated with one of the rotation states discussed above) on the outer circumferential surface of the upper end 514 of the rotary dial 510. The circuit board 700 is secured to the first wall via a fastening member 712 (e.g., a screw, a bolt, a pin, adhesive, clamp, etc . . . ). The biasing member 710 is a coil spring and ball arrangement and the second wall 564 has a width in cross sectional view sufficient to support and accommodate the biasing member 710. While the detent 513/biasing member 710 arrangement is shown, other known releasable locking mechanisms may be employed without departing from the scope of the present application.

Figure 5D:
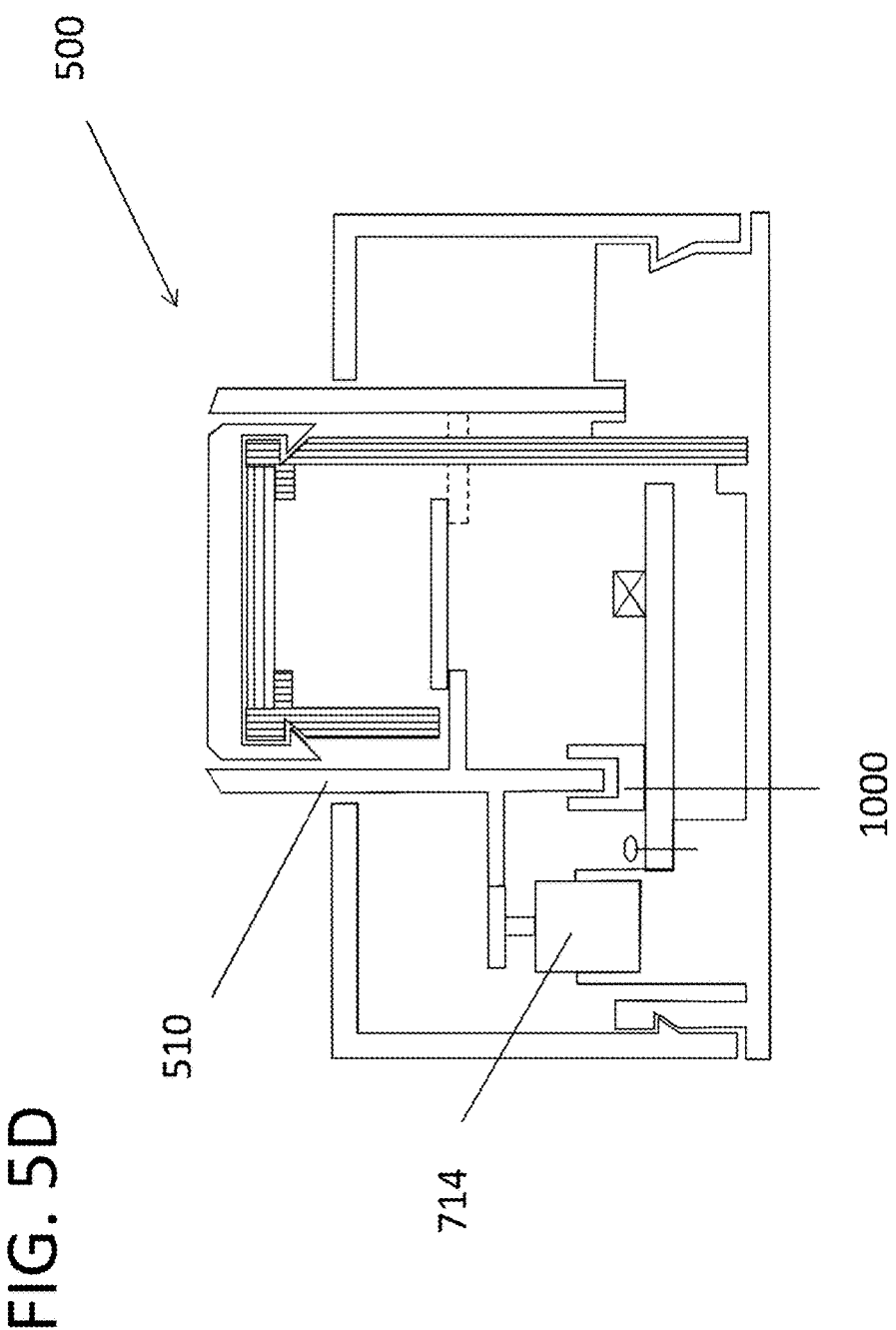
FIG. 5D show a partial cross-sectional view of a modified rotary dial assembly, according to aspects of the present disclosure.

In addition and as shown in FIG. 5D, it is contemplated that alternative to, or in addition to the existing detent 513, a detent functionality may be created by a motor 714 provided in the rotary dial assembly 500. In such a case a photo interrupter 1000 (described in detail below), which is configured to read a given rotation angle, can be utilized. In this regard, normally, the rotary dial 510 can rotate freely. However, the motor 714 is configured to control the rotation of the rotary dial 510 such that an operator can readily identify when the rotary dial 510 is entering a given rotation state (corresponding to a detent position at a specified rotation angle) or being rotated toward another rotation state. For example, when the rotary dial 510 rotates to a given detent position, the motor 714 controls the rotary dial 510 to reduce rotation force and thereby support rotation of the rotary dial 510 to the selected detent position. However, when the rotary dial 510 is rotated out of the selected detent position, the motor 714 controls the rotary dial 510 to increase rotation force and resist rotation to prevent the operator from inadvertently changing the vehicle function (if changing the vehicle function is not intended). Controlling the motor 714 in this way (i.e., reducing or increasing rotation resistance acting against the rotary dial 510) can assist the operator to "feel" the detent when selecting a vehicle function on the rotary dial assembly 500 similar to the detent/biasing member 710 arrangement.

A first section of the second support groove 562 is positioned on the circuit board 700 above the first wall 563 and a second section of the second support groove 562 is positioned on the second wall 564. The first wall 563 is shorter than the second wall 564 in a height direction of the rotary dial assembly 500 and both are positioned radially outward of the first and second sections of the second support groove 562.

FIG. 5B further shows that the upper housing 570 includes an opening 571 at an upper surface 572 thereof such that the upper end 514 of the tubular housing 511 of the rotary dial 510 extends upward from the lower housing 560 and through the opening 571. The rotary dial 510 is rotatable relative to the upper housing 570. The two protrusions 512 of the rotary dial 510 and the second polarized film section 524 of the polarized film assembly 520 are disposed below the opening 571 within the upper housing 570, and the annular flange 555 of the film holder 550 that supports the first polarized film section 522 of the polarized film assembly 520 is disposed above the opening 571 of the upper housing 570.

The light source 540 is provided on the rotation axis 530 of the rotary dial 510 below the polarized film assembly 520 and is configured to pass light through the polarized film assembly 520. When the rotary dial 510 is rotated and the biasing member 710 is biased into one of the plurality of detents 513 on the rotary dial 510 at one of the corresponding rotation states, the light source 540 is illuminated such that at least one of the plurality of graphical images 501a, 501b, 501c is displayed on the upper surface 503 of the rotary dial assembly 500. For example, the rotary dial 510 includes detents 513 at 0°, 45° and 90° and when the rotary dial 510 is rotated into the first rotation state, the ball of the biasing member 710 is biased into the detent at 0°. When the ball is biased into the detent at 0°, the rotary dial assembly 500 can electrically detect the rotation amount to control illumination of the light source 540 and activate the corresponding vehicle function (in this case the foot air flow mode of the A/C air flow direction control device shown in FIG. 3A). The detents 513 are specifically provided only at 0°, 45° and 90° due to the arrangement of the first polarized film section 522 and the second polarized film section 524. In particular, because one of the stacked films of the first polarized film section 522 is positioned to be parallel with the film of the second polarized film section 524 at either 0° or 90°, the specifically positioned detents enable the rotary dial assembly 500 to only display a single graphical image at the rotation state corresponding to 0° and 90° on the rotary dial 510 (and to ensure that the other graphical image is blocked in that rotation state). Without the detent 513 it would be difficult for the operator to confirm the rotation state to clearly display a given graphical image and select the appropriate vehicle function.

Similarly, when the ball is biased into the detent at 45° and 90°, the rotary dial assembly 500 can electrically detect the rotation amount to control illumination of the light source 540, stop the previous vehicle function and activate the next vehicle function corresponding to either the 45° or 90° rotation (in this case the face and foot air flow mode or the face air flow mode of the A/C air flow direction control device shown in FIGS. 3B-3C).

The rotary dial assembly 500 further includes a cover cap 720 that is insertable into the interior of the rotary dial 510 such that an upper surface of the cover cap 720 corresponds to the upper surface 503 of the rotary dial assembly 500. The cover cap 720 is fixed to an upper side of the film holder 550 to cover the first polarized film section 522 from an upper side thereof such that the rotary dial 510 is rotatable relative to the cover cap 720. The first polarized film section 522 is disposed between a lower surface of the cover cap 720 and an upper surface of the annular flange 553 so as to be fixedly secured to the stationary film holder 550.

Accordingly, the cap cover 720 and the annular flange 553 clamp the film layers of the first polarized film section 522 in place to ensure accurate and repeatable selective display of the graphical images 501a, 501b, 501c. The cover cap 720 may be made of any suitable material and at least the upper surface at 503 is transparent so that when the rotary dial 510 is rotated, at least one of the plurality of graphical images 501a, 501b, 501c is easily seen and displayed on the upper surface of the cover cap 720. In embodiments, the cover cap 720 is attached to the film holder 550 via a known snap-fit arrangement. However, the cover cap 720 may be attached to the film holder 550 by any suitable attachment mechanism without departing from the scope of the present application.

Alternatively, it is contemplated that the cap cover 720 may be fixed to the film holder 550 via an adhesive, glue or weld.

FIG. 9 shows a cross sectional view of a photo interrupter 1000 and the plurality of notches 515 disposed on the lower end 516 of the rotary dial 510. The plurality of notches 515 are configured to communicate with the photo interrupter 1000 such that the photo interrupter 1000 detects an amount of rotation of the rotary dial 510. In this manner, detection of the rotation angle and rotation state can be more accurately monitored and the ON and OFF of the light source 540 can be more precisely controlled.

Accordingly, the rotary dial assembly described above enable vehicle functions to be more easily controlled and displayed in a way that improves driver/operator convenience while simplifying the device, reducing manufacturing costs, and minimizing repair.

While the rotary dial assembly has been described with reference to several exemplary embodiments, it is understood that the words that have been used are words of description and illustration, rather than words of limitation. Changes may be made within the purview of the appended claims, as presently stated and as amended, without departing from the scope and spirit of the rotary dial assembly in its aspects. Although the rotary dial assembly has been described with reference to particular means, materials and embodiments, the rotary dial assembly is not intended to be limited to the particulars disclosed; rather the described rotary dial assembly configurations should be considered to extend to all functionally equivalent structures, methods, and uses such as are within the scope of the appended claims.

Although the present specification may describe components and functions that may be implemented in particular embodiments with reference to particular standards and protocols, the disclosure is not limited to such standards and protocols. For example, components of the non-limiting embodiments of the various electrical circuits represent examples of the state of the art. Such standards are periodically superseded by equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A rotary dial assembly, comprising:
   a rotary dial configured to selectively display a plurality of graphical images;
   a polarized film assembly disposed in the rotary dial and configured to control the selective displaying of the plurality of graphical images on the rotary dial;
   a film holder that supports a first polarized film section of the polarized film assembly, the first polarized film section being a multilayer film that includes at least one absorbing polarized film layer including the plurality of graphical images;
   a lower housing configured to rotatably support the rotary dial and secure the film holder in a fixed state such that the rotary dial is rotatable relative to the film holder; and
   an upper housing configured to cover the lower housing and a portion of the rotary dial, wherein
   the film holder comprises:
      a tubular main body provided at an upper side of the film holder;
      an annular flange disposed on an inner circumferential surface of the tubular main body and configured to support the first polarized film section of the polarized film assembly; and
      a plurality of annular wall sections extending from the tubular main body toward a lower side of the film holder, the annular wall sections being spaced from each other in a circumferential direction of the film holder to permit rotation of the rotary dial, and
   when the rotary dial is rotated the polarized film assembly is illuminated such that at least one of the plurality of graphical images is displayed on the rotary dial assembly.

2. The rotary dial assembly of claim 1, wherein
the plurality of graphical images includes a first graphical image and a second graphical image,
when the rotary dial is rotated by a first rotation amount the first graphical image is displayed on the rotary dial assembly, and
when the rotary dial is rotated by a second rotation amount the second graphical image is displayed on the rotary dial assembly.

3. The rotary dial assembly of claim 1, wherein
the polarized film assembly comprises:
the first polarized film section; and
a second polarized film section, wherein
the first polarized film section is spaced from the second polarized film section along a rotation axis of the rotary dial, and
when the rotary dial is rotated one of the first polarized film section and the second polarized film section is rotated relative to the other of the first polarized film section or the second polarized film section.

4. The rotary dial assembly of claim 1, wherein
the polarized film assembly comprises:
the first polarized film section; and
a second polarized film section, wherein
the first polarized film section is spaced from the second polarized film section along a rotation axis of the rotary dial,
the first polarized film section is a multilayer film and includes at least two absorbing polarized film layers, each film layer including one of the plurality of graphical images, each film layer having a film layer polarization orientation and each film layer polarization orientation being oriented 90° from another film layer polarization orientation of another film layer, the first polarized film section being stacked along the rotation axis of the rotary dial,
the second polarized film section includes an absorbing polarized film having an absorbing polarized film polarization orientation oriented 90° from one of the film layer polarization orientations of one of the absorbing polarized film layers of the first polarized film section, the second polarized film section being provided on the rotation axis of the rotary dial at a position below the first polarized film section, and
when the rotary dial is rotated the first polarized film section is rotated relative to the second polarized film section such that at least one of the graphical images is displayed on the rotary dial assembly.

5. The rotary dial assembly of claim 1, wherein
the polarized film assembly comprises:
the first polarized film section; and
a second polarized film section, wherein
the first polarized film section is spaced from the second polarized film section along a rotation axis of the rotary dial,
the first polarized film section is a multilayer film and includes at least one absorbing polarized film layer including the plurality of graphical images, each film layer having a film layer polarization orientation and each film layer polarization orientation being oriented 90° from another film layer polarization orientation of another film layer, the first polarized film section being stacked along the rotation axis of the rotary dial,
the second polarized film section includes an absorbing polarized film having an absorbing polarized film polarization orientation that is provided on the rotation axis of the rotary dial at a position below the first polarized film section, and
when the rotary dial is rotated the polarization orientation of the second polarized film section is rotated relative to the film layer polarization orientation of each graphic image on the at least one absorbing polarized film layer such that at least one of the graphical images is displayed on the rotary dial assembly.

6. The rotary dial assembly of claim 1, further comprising:
a light source provided below the polarized film assembly and configured to pass light through the polarized film assembly to display at least the one of the plurality of graphical images on the rotary dial, wherein
when the rotary dial is rotated the light source is illuminated to display at least one of the plurality of graphical images on the rotary dial assembly.

7. The rotary dial assembly of claim 6, wherein
the plurality of graphical images includes a first graphical image and a second graphical image,
when the rotary dial is rotated by a first rotation amount the first graphical image is displayed on the rotary dial assembly,
when the rotary dial is rotated by a second rotation amount the first graphical image and at least a portion of the second graphical image are displayed on the rotary dial assembly, and
when the rotary dial is rotated by a third rotation amount the second graphical image is displayed on the rotary dial assembly.

8. The rotary dial assembly of claim 1, wherein
the rotary dial comprises:
a tubular housing configured to surround the film holder in a concentric manner such that the tubular housing is rotatable relative to the film holder; and
at least one protrusion that projects inwardly from an inner circumferential surface of the tubular housing in a direction perpendicular to a rotation axis of the rotary dial, the at least one protrusion supporting a second polarized film section of the polarized film assembly, the second polarized film section including an absorbing polarized film, wherein
the second polarized film section is positioned below the first polarized film section along the rotation axis of the rotary dial, and
when the rotary dial is rotated the second polarized film section is rotated relative to the first polarized film section supported by the film holder.

9. The rotary dial assembly of claim 1, wherein
the rotary dial comprises:
a tubular housing configured to surround the film holder in a concentric manner such that the tubular housing is rotatable relative to the film holder; and
at least one protrusion that projects inwardly from an inner circumferential surface of the tubular housing in a direction perpendicular to a rotation axis of the rotary dial, the at least one protrusion supporting a second polarized film section of the polarized film assembly, wherein
the at least one protrusion of the rotary dial projects between at least two of the spaced annular wall sections of the film holder such that the second polarized film section is aligned with the first polarized film section along the rotation axis of the rotary dial, and
when the rotary dial is rotated the spacing between the at least two annular wall sections permits the at least one protrusion and the second polarized film section to rotate relative to the film holder and the first polarized film section.

10. The rotary dial assembly of claim 8, wherein the tubular housing includes a plurality of notches provided along an outer circumferential surface of the rotary dial at a lower end thereof, the plurality of notches being configured to communicate with a photo interrupter that detects an amount of rotation of the rotary dial.

11. The rotary dial assembly of claim 1, wherein the lower housing comprises:
a first support groove that supports a lower end of the film holder;
a second support groove that supports a lower end of the rotary dial;
a first wall that is configured to support a circuit board and a light source; and
a second wall that is configured to house a biasing member that is removably biased into a plurality of detents on an outer circumferential surface of the rotary dial.

12. The rotary dial assembly of claim 8, wherein the upper housing includes an opening at an upper side thereof such that an upper portion of the tubular housing of the rotary dial extends upward from the lower housing and through the opening, the rotary dial being rotatable relative to the upper housing,
the at least one protrusion and the second polarized film section of the polarized film assembly are disposed below the opening within the upper housing, and
at least a portion of the film holder that supports the first polarized film section of the polarized film assembly is disposed above the opening of the upper housing.

13. The rotary dial assembly of claim 11, further comprising:
the light source, wherein
the light source is provided on a rotation axis of the rotary dial below the polarized film assembly and configured to pass light through the polarized film assembly, and
when the rotary dial is rotated and the biasing member is biased into one of the plurality of detents on the rotary dial the light source is illuminated such that at least one of the plurality of graphical images is displayed on the rotary dial assembly.

14. The rotary dial assembly of claim 9, wherein the first polarized film section is a multilayer film and includes a first absorbing polarized film layer including a first graphical image and a second absorbing polarized film layer including a second graphical image, each absorbing polarized film layer having a film layer polarization orientation and the film layer polarization orientation of the first absorbing polarized film layer is oriented 90° from the film layer polarization orientation of the second polarized graphic image layer, the first polarized film section being stacked along the rotation axis of the rotary dial,
the second polarized film section includes an absorbing polarized film having a polarization orientation that is provided on the rotation axis of the rotary dial at a position below the first polarized film section, and
when the rotary dial is rotated the polarization orientation of the second polarized film section is rotated relative to the film layer polarization orientation of each absorbing polarized film layer such that at least one of the first and second graphical images is displayed on the rotary dial assembly.

15. The rotary dial assembly of claim 1, wherein the plurality of graphical images includes a first graphical image and a second graphical image,
when the rotary dial is rotated by a first rotation amount the first graphical image is displayed on the rotary dial assembly,
when the rotary dial is rotated by a second rotation amount the first graphical image and at least a portion of the second graphical image are displayed on the rotary dial assembly, and
when the rotary dial is rotated by a third rotation amount only the second graphical image is displayed on the rotary dial assembly.

16. A display assembly comprising:
a light source configured to emit light having a specific polarizing axis;
a first polarized film that includes a first graphic display region that is configured to transmit first polarized light having a first polarizing axis and a first non-polarized region that is configured not to transmit polarized light having a polarizing axis different from the first polarizing axis;
a second polarized film that includes a second graphic display region that is configured to transmit second polarized light having a second polarizing axis and a second non-polarized region that is configured not to transmit polarized light having a polarizing axis different from the second polarizing axis; and
a rotation assembly that supports the first polarized film and the second polarized film side by side along a traveling direction of the light from the light source such that the first polarizing axis and the second polarizing axis are orthogonal to each other, and that integrally rotates the first polarized film and the second polarized film, wherein
by integrally rotating the first polarized film and the second polarized film with the rotation assembly, the graphic display region through which the light from the light source transmits is changed to one of the first graphic display region or the second graphic display region.

* * * * *